US012677721B2

(12) United States Patent
Ono

(10) Patent No.: US 12,677,721 B2
(45) Date of Patent: Jul. 14, 2026

(54) WORK VEHICLE

(71) Applicant: ISEKI & CO., LTD., Matsuyama (JP)

(72) Inventor: Koki Ono, Iyo-gun (JP)

(73) Assignee: ISEKI & CO., LTD., Matsuyama (JP)

( * ) Notice: Subject to any disclaimer, the term of this patent is extended or adjusted under 35 U.S.C. 154(b) by 0 days.

(21) Appl. No.: 18/797,665

(22) Filed: Aug. 8, 2024

(65) Prior Publication Data

US 2025/0048952 A1     Feb. 13, 2025

(30) Foreign Application Priority Data

Aug. 9, 2023     (JP) .................................. 2023-130168

(51) Int. Cl.
*A01B 69/00*          (2006.01)
*A01B 69/04*          (2006.01)
*A01F 15/08*          (2006.01)

(52) U.S. Cl.
CPC ............ *A01B 69/008* (2013.01); *A01F 15/08* (2013.01)

(58) Field of Classification Search
CPC ....... A01B 69/008; A01F 15/08; A01F 15/071
See application file for complete search history.

(56) References Cited

U.S. PATENT DOCUMENTS

| | | | | |
|---|---|---|---|---|
| 6,901,719 | B2 * | 6/2005 | Viaud ................. | A01F 15/0883 |
| | | | | 53/118 |
| 8,942,897 | B2 * | 1/2015 | Foster .................. | A01D 46/08 |
| | | | | 701/484 |
| 9,930,834 | B2 * | 4/2018 | Chaney ................... | A01F 15/08 |
| 10,436,913 | B2 * | 10/2019 | Lang ........................ | G01S 19/13 |
| 11,134,614 | B2 * | 10/2021 | Eubanks ............. | A01F 15/0833 |
| 12,364,205 | B2 * | 7/2025 | Roberge .............. | A01F 15/0715 |
| 2012/0060444 | A1 * | 3/2012 | Reijersen Van Buuren ................ | |
| | | | | A01F 15/071 |
| | | | | 53/203 |
| 2021/0105948 | A1 * | 4/2021 | Johnson .................. | G01S 19/14 |
| 2022/0225557 | A1 * | 7/2022 | Cooley ................ | A01B 69/008 |
| 2022/0225571 | A1 * | 7/2022 | Simmons ................ | A01F 15/08 |
| 2024/0040965 | A1 * | 2/2024 | Anderson ............. | G05D 1/246 |

FOREIGN PATENT DOCUMENTS

| | | | | |
|---|---|---|---|---|
| JP | 2017012134 | A | * | 1/2017 |
| JP | 2022-187918 | A | | 12/2022 |
| JP | 7231397 | B2 | * | 3/2023 |

* cited by examiner

*Primary Examiner* — Peter D Nolan
*Assistant Examiner* — Peter Y Ning
(74) *Attorney, Agent, or Firm* — Finnegan, Henderson, Farabow, Garrett & Dunner LLP

(57)                    ABSTRACT

To provide a work vehicle capable of improving efficiency of wrapping work by computing a wrapping travel path, based on work route records by a roll baler. A work vehicle, which moves along position information by a GNSS receiver on a map in which a work travel path and a circling travel path by a roll baler are registered, includes a work locus recording control section that records a roll release point P together with a work locus, and generates a wrapping travel path when a wrapping machine is attached, based on the recorded roll release point. The traveling direction of the wrapping travel path is set to be orthogonal to an axial direction of a cylindrical roll at the roll release point.

3 Claims, 7 Drawing Sheets

【FIG.2】

【FIG.6】
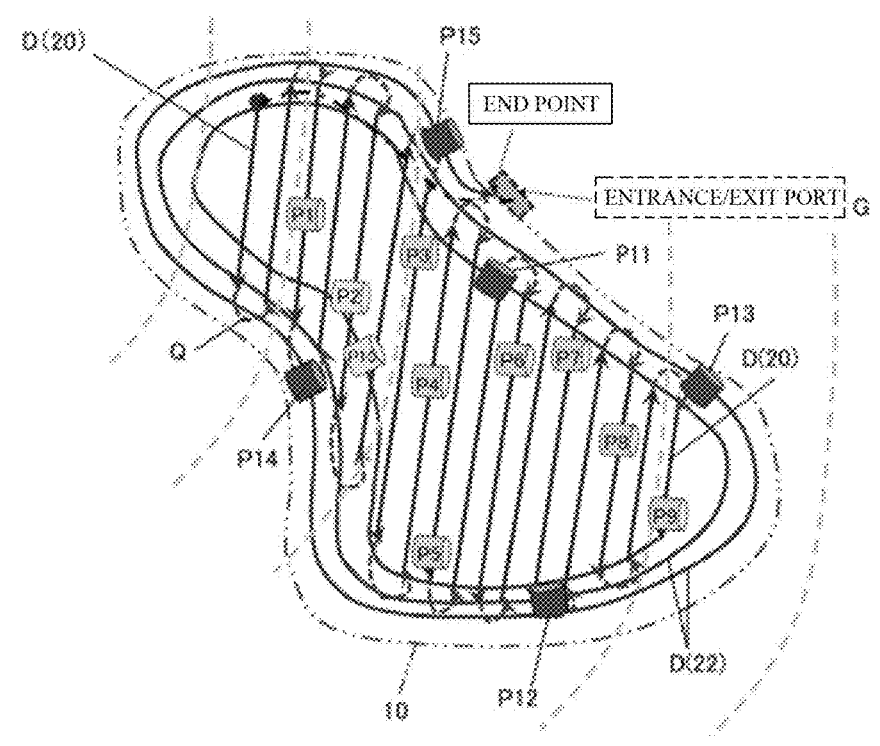

【FIG.7】
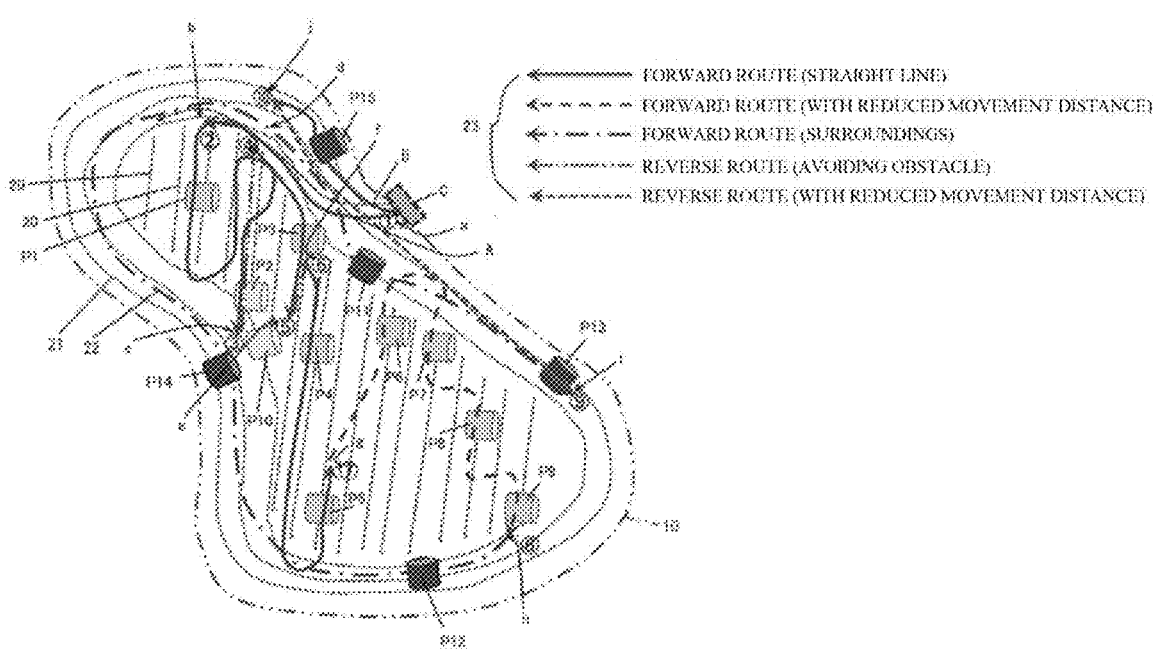

WORK VEHICLE

TECHNICAL FIELD

The present invention relates to a work vehicle to which a roll baler and a wrapping machine can be attached.

BACKGROUND ART

A work vehicle is known that includes a roll baler work machine in a rear portion of a vehicle body thereof and autonomously travels along a travel path, based on position information, which is acquired from a positioning device provided in the vehicle, and information on the travel path, which is set in advance (Patent Document 1).

Patent Document 1: Japanese Unexamined Patent Publication No. 2022-187918

SUMMARY OF INVENTION

According to Patent Document 1, it is possible for the vehicle to perform the roll packing work while automatically traveling.

However, there is no description about autonomous travel for works of lifting a roll in a farm field and wrapping the roll with a film or the like in connection with the roll baler work.

An object of the present disclosure is to provide a work vehicle capable of improving efficiency of wrapping work by computing a wrapping travel path, based on a record of a work route by a roll baler.

In order to solve the above-described problem and achieve the object, a work vehicle attached with a wrapping machine (140W) that wraps a roll released by a roll baler (140B) is a work vehicle that moves along a wrapping travel path (23) when the wrapping machine (140W) is attached, and is characterized by including: a work locus recording control section (330) that records a roll release point (P) by a roll baler (140B); and a path calculation section (306) that generates the wrapping travel path (23), based on the recorded roll release point (P).

An automatic wrapping travel path is generated, and a work vehicle 100 attached with a wrapping machine 140W can automatically travel along the wrapping travel path, and therefore, a wrapping process can be efficiently performed on rolls at roll release points P1 to P15.

BRIEF DESCRIPTION OF DRAWINGS

FIG. 6 is a diagram illustrating a travel locus (autonomous travel path) of baler work and a roll release point.

FIG. 7 is a diagram illustrating an example of a wrapping travel path.

DESCRIPTION OF EMBODIMENTS

Hereinafter, preferred embodiments of the present disclosure will be described with reference to the drawings.

Figure 1:
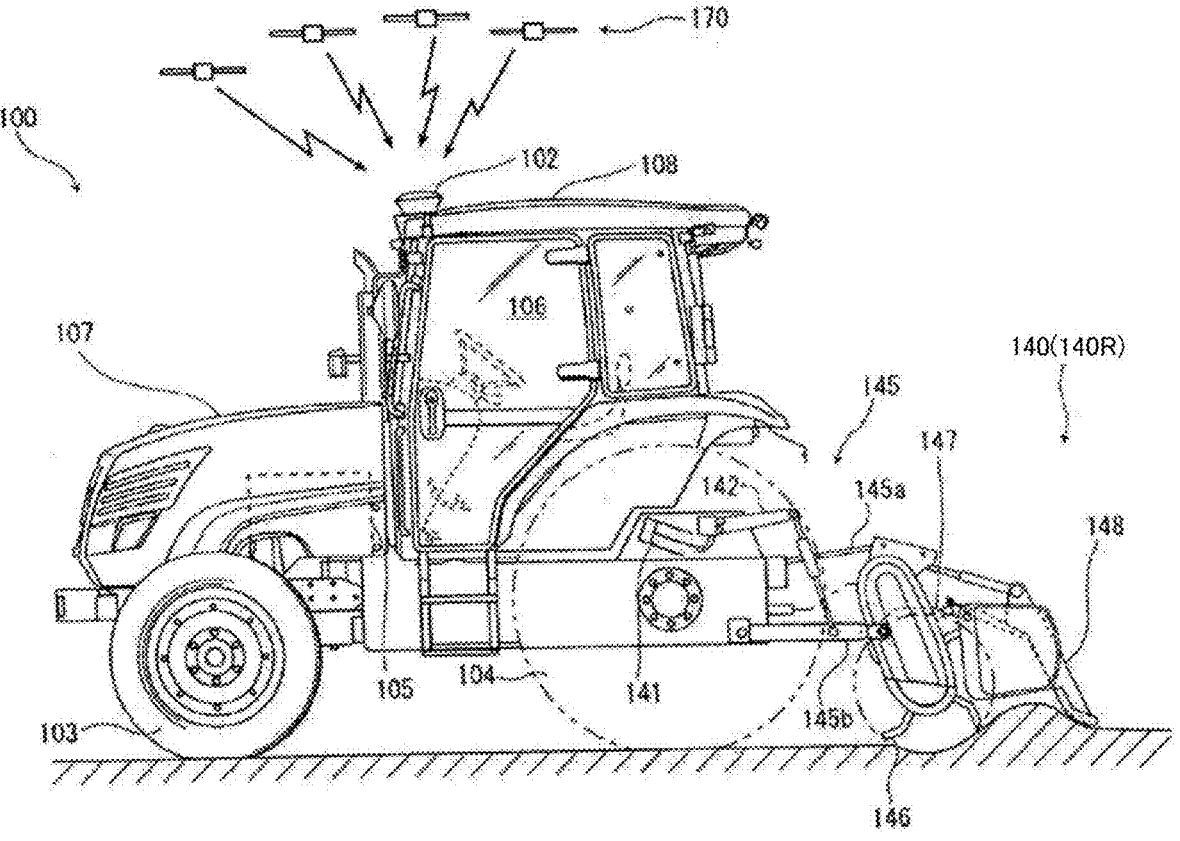
FIG. 1 is a side view of an agricultural tractor as a work vehicle according to an embodiment of the present invention.

FIG. 1 is a schematic side view illustrating a configuration of a work vehicle 100 of a work vehicle management system according to an embodiment of the present invention. The work vehicle 100 is a vehicle for agricultural work that can travel in a reciprocating adjacent work travel range 13, includes an engine 105, which is covered by a bonnet 107, disposed in a front portion of a vehicle body, and is able to travel by transmitting rotational power of the engine 105 to a front wheel 103 and a rear wheel 104 via a plurality of transmissions. Further, a steering section 106 is provided behind the engine 105, and a work machine 140 capable of tilling the reciprocating adjacent work travel range 13 is attached to a rear portion of the vehicle body behind the steering section 106.

The steering section 106 is provided with a cabin including a steering handle operated by an operator and a steering seat. A GNSS receiver 102 is provided on a cabin roof 108, which is the ceiling of the cabin, and is able to measure a position of the work vehicle 100 by receiving radio waves from an artificial satellite 170 at predetermined time intervals.

A connecting hitch 145 composed of a top link 145a on the upper side and right and left lower links 145b on the lower side is provided at the rear portion of the vehicle body of the work vehicle 100, and the work machine 140 is connected to the three-point link mechanism. The work machine 140 is a tilling work machine, and is provided with a tilling claw 146 for tilling soil in a farm field, a rotary cover 147 for covering the upper part of the tilling claw 146, and a rear cover 148 supported by the rear portion of the rotary cover 147 so as to be vertically movable. Examples of the work machine 140 include a roll baler 140B and a wrapping machine 140W, which will be described below, in addition to a tilling work machine 140R.

A work machine lifting cylinder 141 is connected to the lower link 145b of the connecting hitch 145 via a lift arm 142, and the lower link 145b can be moved up and down by extending and contracting the work machine lifting cylinder 141.

Figure 2:
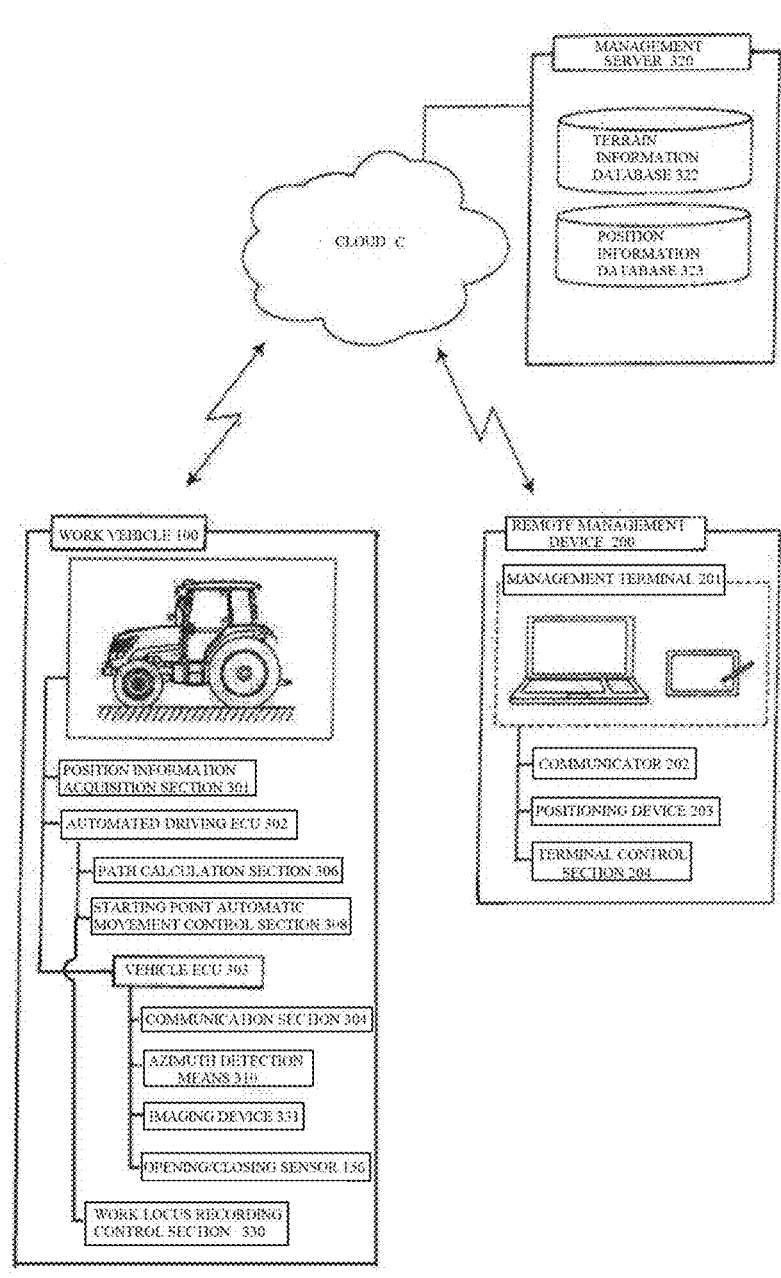
FIG. 2 is a block diagram of a management system.

FIG. 2 is a block diagram illustrating a configuration of a work vehicle management system 1 according to a preferred embodiment of the present invention. The work vehicle 100 includes a position information acquisition section 301, which is a position information acquisition means, that acquires position information of the machine from radio waves received by the GNSS receiver 102 in FIG. 1, an automated driving ECU 302 that controls autonomous travel of the vehicle, and a vehicle ECU 303 that controls the vehicle travel and operation of the work machine, and the vehicle ECU 303 includes a communication section 304 that mutually communicates with a cloud C forming a communication network, and a path calculation section 306 that calculates a travel path from the position information and terrain information.

Therefore, the work vehicle 100 can transmit the position information of the machine acquired by the position information acquisition section 301 to the cloud C via the communication section 304 at predetermined time intervals and store the position information in the cloud C, and is able to acquire information stored in the cloud C.

A remote management device 200 is a portable electronic computing device, and includes a management terminal 201 that can be operated by a management user. The management terminal 201 includes a communicator 202 that can mutually communicate with the cloud C, and a terminal control section 204 that controls the management terminal 201. Therefore, the management user can exchange information with the cloud C via the communicator 202 by carrying the management terminal 201.

In this way, since the work vehicle 100 and the remote management device 200 can communicate with each other via the cloud C, the management user can monitor a state of the work vehicle 100 and send a command by using the remote management device 200, and it is possible to remotely manage the work vehicle 100.

The cloud C is provided with a management server 320. In the management server 320, a terrain information database 322 that stores terrain information of a farm field and its surroundings and a position information database 323 that stores position information of the work vehicle 100 are recorded. Therefore, the management user can grasp a positional relationship between the work vehicle 100 and the farm field by accessing the management server 320 and referring to the terrain information database 322 and the position information database 323.

Figure 3:
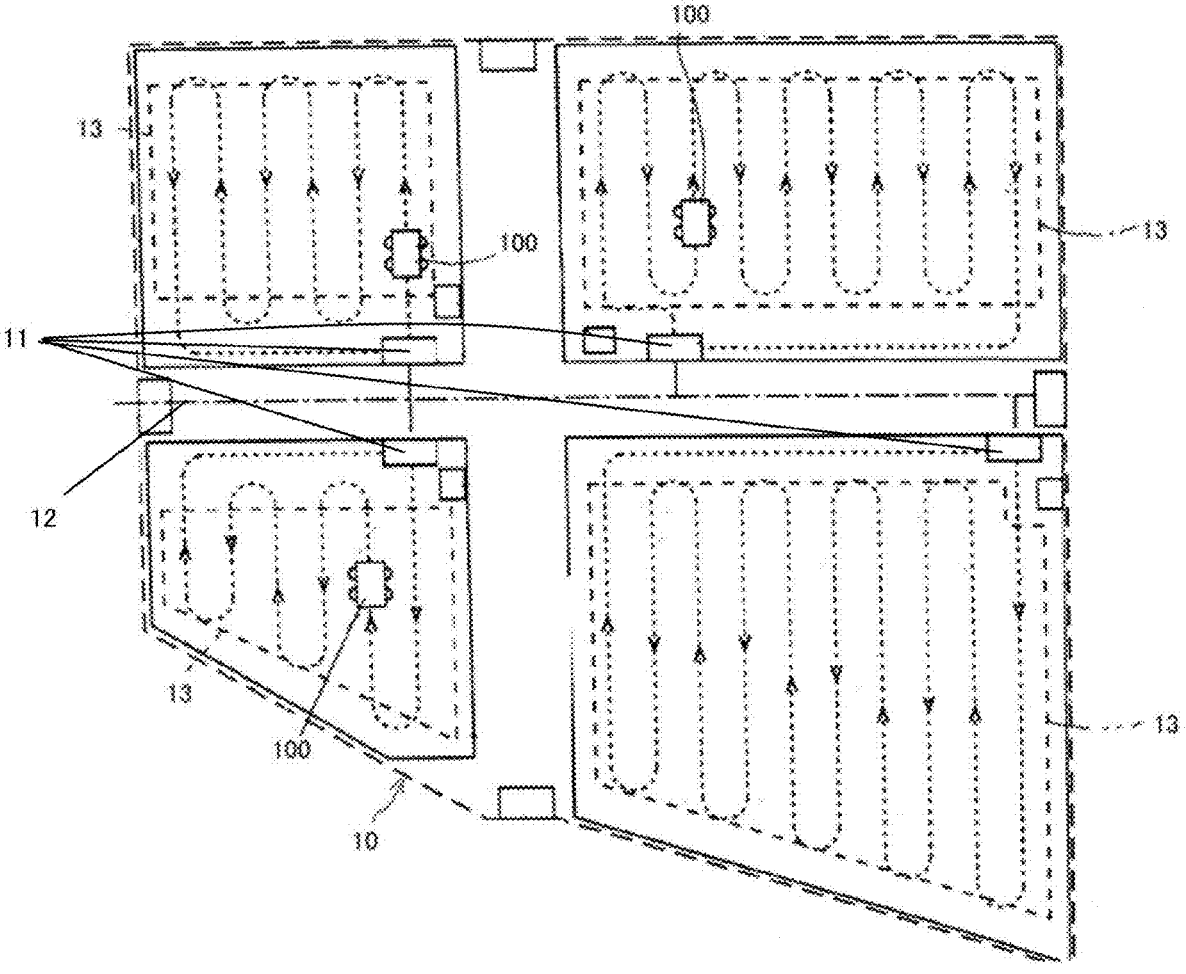
FIG. 3 is a schematic diagram illustrating a plurality of farm fields.

FIG. 3 is a schematic diagram illustrating the reciprocating adjacent work travel range 13 set for each of a plurality of managed farm field areas 10, and the work vehicle 100 works and travels in each reciprocating adjacent work travel range 13 in the plurality of the farm field areas 10. Each reciprocating adjacent work travel range 13 is in contact with a management passage 12, and the work vehicle 100 can enter and exit through a doorway 11.

The management terminal 201 includes a farm field identification means for identifying which work vehicle 100 is working in which reciprocating adjacent work travel range 13, and accesses the management server 320 via the cloud C illustrated in FIG. 2, compares and refers to position information of each of the reciprocating adjacent work travel ranges 13 stored in the terrain information database 322 and the position information of the work vehicle 100 stored in the position information database 323, thereby enabling to identify the work vehicle 100 existing in a range where the reciprocating adjacent work travel range 13 is located and to associate the work vehicle with the farm field where the work vehicle is working.

Herein, in the management terminal 201, the terminal control section 204 can acquire terrain information about the management passage 12 in the managed area 10 and the reciprocating adjacent work travel range 13 from the terrain information database 322 illustrated in FIG. 2 via the cloud C by a positioning device 203.

Figure 4:
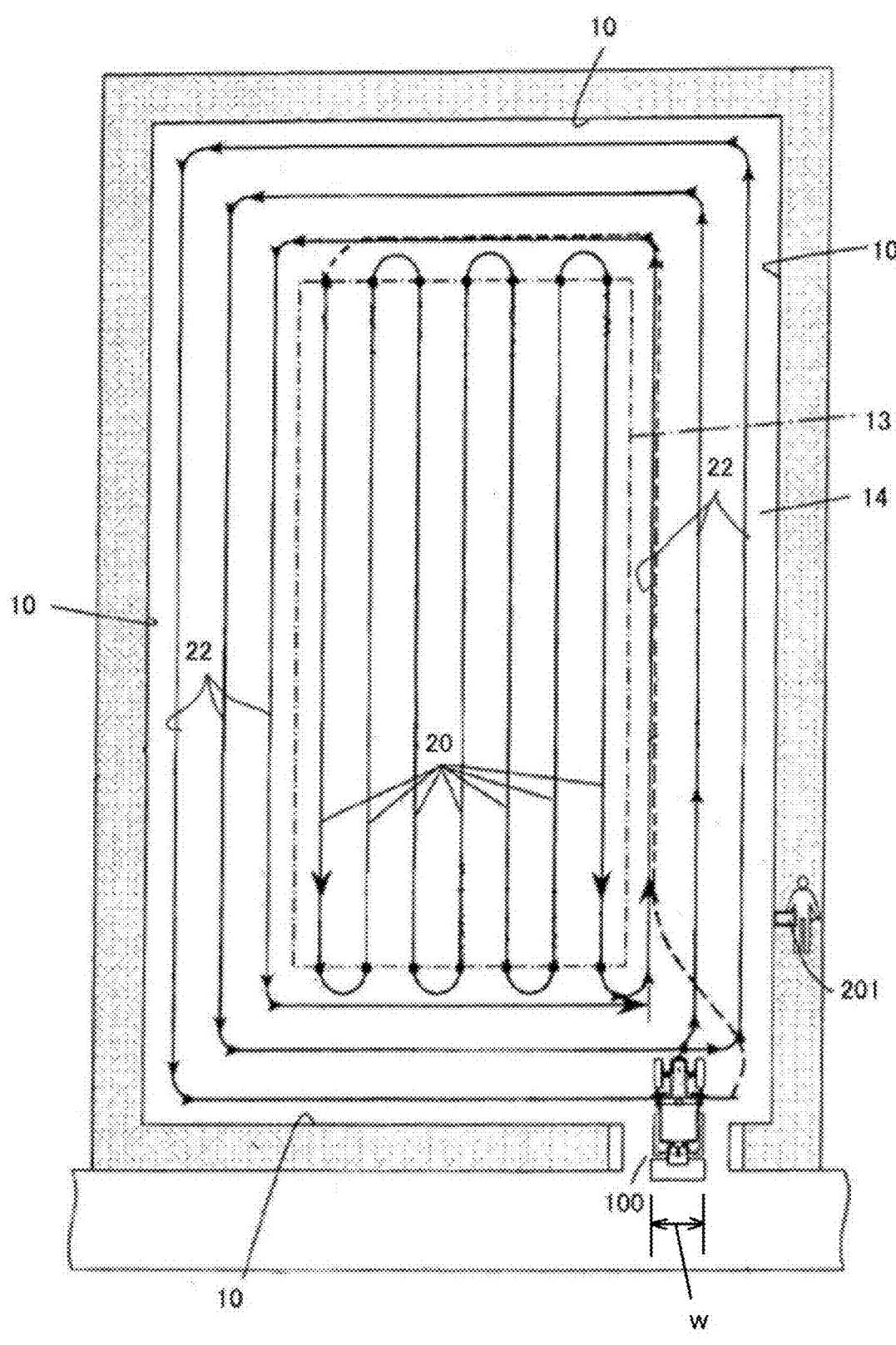
FIG. 4 is a diagram illustrating an example of a headland travel path and a reciprocating travel path.

As illustrated in FIG. 4, when the work vehicle 100 works and travels in the reciprocating adjacent work travel range 13, the path calculation section 306 illustrated in FIG. 2 calculates the work travel path 20, which is a path for working and traveling in the reciprocating adjacent work travel range 13, based on the terrain information of the reciprocating adjacent work travel range 13 and a work width w of the work vehicle 100. In order to work and travel evenly in the reciprocating adjacent work travel range 13, it is sufficient to travel straight through the reciprocating adjacent work travel range 13 by the number acquired by dividing the width of the reciprocating adjacent work travel range 13 by the work width w. The work travel path 20 is calculated in such a way as to reciprocate in the reciprocating adjacent work travel range 13 by a straight path D which goes straight on the reciprocating adjacent work travel range 13 and a turning path Q which goes out of the reciprocating adjacent work travel range 13, turns at a headland 14, and returns to the reciprocating adjacent work travel range 13. When the work travel path 20 is calculated, the work vehicle 100 passes through the entire farm field by work travel while reciprocating from one end to an other end of the reciprocating adjacent work travel range 13 along the work travel path 20 by autonomous travel.

Figure 5A:
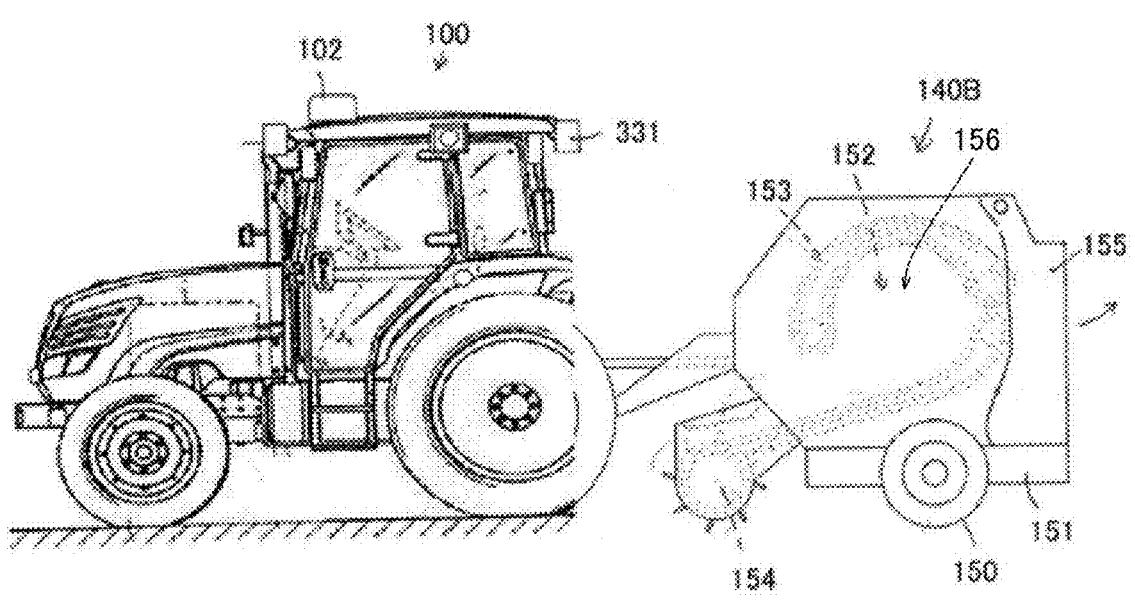
FIG. 5A is a side view in which a roll baler being a work machine is attached to the work vehicle.

FIG. 5A illustrates an example in which a roll baler 140B is attached to the rear portion of the work vehicle 100, and the roll baler is connected to the rear portion of the work vehicle 100 via a connecting hitch 145. The roll baler 140B is a grass-collecting work machine that collects and compresses hay, straw, and the like in a farm field and packs them into a cylindrical shape.

In FIG. 5A, a baler part 153 having a forming chamber 152 is mounted above a frame 151 having a wheel 150, and a pickup section 154 for picking up straw grass from a farm field is provided in front of the baler part 153.

As in FIG. 4, in the predetermined managed farm field area 10, the work travel path 20 acquired based on the terrain information of the reciprocating adjacent work travel range in the baler work and a baler work width wb of the work vehicle 100 is computed by the path calculation section 306 in FIG. 2.

Then, the work vehicle 100 can reciprocate along the work travel path 20 from one end to an other end of the reciprocating adjacent work travel range 13 by autonomous travel, turn at the other end, follow an adjacent work travel path 20, and further can perform the baler work travel in the entire farm field area 10 while traveling along a circling travel path 22 drawn in a circling route range outside the reciprocating adjacent work travel range 13.

The automated driving ECU 302 is provided with a work locus recording control section 330 and can record a work locus. The work locus recording control section 330 can record a roll release point P together with the work travel path 20. Namely, when the collected grass reaches a predetermined amount, the roll baler 140B discharges a formed roll near the center in the traveling direction. The discharge position is estimated from the position of the vehicle-mounted GNSS receiver 102 and recorded. As a result, it is possible to generate a driving route in consideration of an offset amount of a wrapping machine to be described below, thereby enabling to perform automated driving.

An example of the baler work is illustrated in FIG. 6. The baler work is performed while moving along a work travel path 20 from a work starting point S, the vehicle turns as illustrated by a dotted line Q at the final end of a straight-line path D, which is illustrated by the final end of an arrow of the straight-line path in the work travel path 20, and the baler work is continued thereafter, and the straight-line path D . . . and the turning path Q . . . are repeated. In the middle of this baler work, a release cover 155 at the rear portion of the baler part 153 opens and a formed cylindrical roll of hay or the like is discharged to a farm field, but the work locus recording control section 330 recognizes the roll release from the release cover 155 by detection of an opening/closing sensor 156 and records it as roll release points P1 and P2 . . . .

Incidentally, when the roll release point P is in a circling range 21 due to the opening movement of the release cover 155 being executed during turning, and the like, the roll release point P is recorded with a marking of abnormality. In FIG. 6, roll release points indicated by symbols P11 to P15 are each marked with a marking of abnormality. When an automatic driving route is generated based on the circling travel path 22, it is impossible to travel during automatically driving and the roll that has been released in the circling range 21 of the baler becomes an obstacle. Therefore, displaying the roll with a marking of abnormality is effective for generating a path avoiding the obstacle.

In addition, the released roll is imaged by an imaging device 331 disposed at the rear portion of the work vehicle 100, and when the released roll position is a position overlapping two paths of the work travel path 20 and the circling travel path 22, the released roll position is recorded with a marking of abnormality. In FIG. 6, roll release points indicated by symbols P2 and P10 correspond to those with the marking of abnormality. In this case as well, when an automatic driving route is generated based on the circling travel path 22, it is impossible to travel during automatically driving and the roll that has been released in the circling range 21 of the baler becomes an obstacle. Therefore, displaying the roll with a marking of abnormality is effective for generation of a path avoiding the obstacle.

The path calculation section 306 computes a wrapping travel path 23 by the wrapping machine 140W, based on the position of the roll release point P. Since the route is generated based on the roll release points P sequentially plotted as described above, it is possible to efficiently generate the route of the wrapping work, i.e., the wrapping travel path 23 by referring to the route of the baler work, or the like.

Figure 5B:
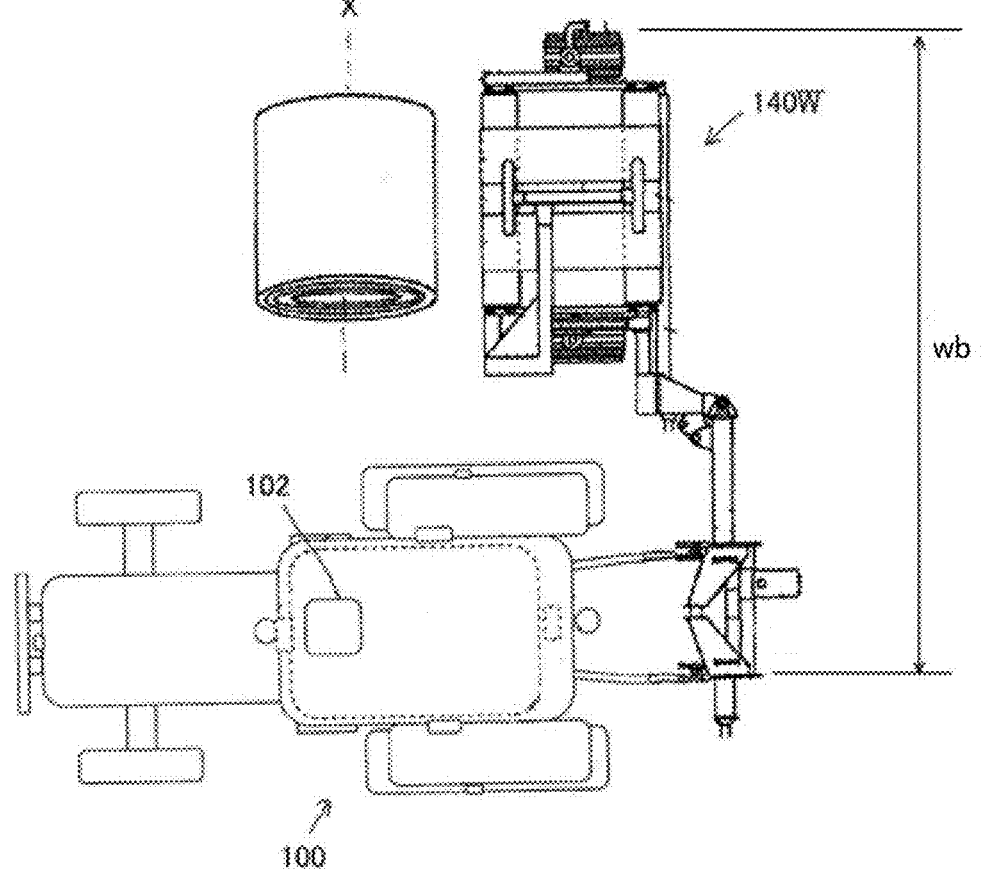
FIG. 5B is a plan view in which a wrapping machine being a work machine is attached to the work vehicle.

The wrapping machine 140W, an example of which is illustrated in FIG. 5B, is attached so as to be positioned on the side of the work vehicle 100, and loads a roll in a farm field, wrap the roll with a film, and unloads the roll to the farm field again. Further, at the time of wrapping, since the roll is collected into the main-body of the wrapping machine 140W while being rotated in the radial direction, it is necessary to enter the roll in a direction orthogonal to a column axial direction (X). Therefore, it is desirable that the relationship between the axial direction of the cylindrical roll and the traveling direction of the work vehicle 100 is determined by the imaging device 331 when the wrapping travel path 23 is generated, and the wrapping machine 140W is attached to the side of the work vehicle 100 in such a way that the wrapping machine 140W can approach the roll from a direction orthogonal to the axial direction of the roll.

In the computing of the wrapping travel path 23, a roll release direction on either the work travel path 20 or the circling travel path 22 is estimated, and the wrapping travel path 23 is computed in such a way as to approach from the direction orthogonal to the axial direction of the roll. In addition, an offset amount (ε) between the wrapping machine 140W and the work vehicle 100 is also taken into consideration in the computing. Since the wrapping machine 140W cannot successfully approach the roll on the work travel path 20 and the circling travel path 22 for the baler work, the offset amount is added. The wrapping machine 140W may be attached to the front side or the rear side of the work vehicle 100, and in either case, it is necessary to compute and set the entering direction with respect to the roll.

FIG. 7 illustrates an example of the wrapping travel path. On the basis of a route order from a start point A to an end point Z of an automatic driving route (hereinafter, sometimes referred to as a baler travel route) by a reciprocating work travel path 20 and a circling travel path 22 when a roll baler 140B is attached, a roll release point P1 which comes first on the route is set as a first wrapping roll to perform wrapping work. A starting point guidance route a-b from an entrance/exit port G to the roll release point P1 is computed and generated toward the work travel path 20 where the first roll exists. By utilizing a straight-line route at the time of the baler work, i.e., the work travel path 20, the starting point guidance route can be easily generated. Next to the roll release point P1, the vehicle moves in such a way as to substantially follow the work travel path 20 (route b-c in FIG. 7), and performs the wrapping work at a roll release point P2.

The roll at a roll release point P10 at a final end c point of the route b-c is recorded with a marking of abnormality, and when it is determined that the vehicle cannot travel straight or turn as it is from the roll release point P10, a reverse travel route c-d for avoiding an obstacle is generated after the roll is collected. After the wrapping work at a predetermined position, when the forward travel work cannot be continued, a route capable of continuing the wrapping work can be generated by avoiding the obstacle on the reverse travel route. As the straight-line route in the reverse travel direction, a route closest to the position of the own vehicle in the work travel path 20 during the roll baler 140B work or a route parallel to the route is set as the reverse travel route. When traveling on the reverse travel route c-d and reaching a straight-line path D end in a work travel path 20 of a roll baler 140B, forward work is restarted, and a route d-e is generated as a target line of a next process with the work travel path 20 of the roll baler 140B having a next roll release point P3 as a target.

In a case where there is a roll release point P3 on a reverse travel route e-f when the vehicle cannot travel forward on the route d-e and the reverse travel route e-f is generated, a next roll release point P4 is compared with the roll release point P3 on the reverse travel route e-f, and a reverse travel route f-g to the position where the vehicle can travel to the next roll release points P4 and P5 is generated. This becomes a forward travel route f-g that allows the vehicle to travel to the next roll release points P4 and P5. In other words, when a wrapping route is generated by, for example, temporarily deviating from the baler travel route and newly generating a reverse travel route while utilizing the baler travel route, the baler travel route is utilized and set in such a way as to move to the next roll release point P in the shortest distance, and thus the wrapping travel path can be easily generated.

With respect to the movement from the roll release point P of this time to the roll collecting point of the next time, when a route laterally movable to a straight-line route allowed to go directly to the roll collecting of the next time can be generated (f to P4 in FIG. 7), a lateral movement route for moving to the straight-line route is newly generated, and when the route laterally movable cannot be generated (P4 to P5 in FIG. 7), a route by turning is generated (the route f-g in FIG. 7).

Regarding the roll release points on the straight-line route, an automatic route is generated as a rule that when there are roll release points P6, P7, P8, and P9 in next order at which the lateral movement route orthogonal to the roll can be generated, a route g-h for collecting in advance of the next order may be generated. As for the route g-h, in addition to the lateral movement route, a turning route is added to the rules when lateral movement is not possible but turning is possible. While utilizing the straight-line path D in the work travel path 20 of the baler work, i.e., a straight-line work route, a route of a distance shorter than that at the time of the baler work can be generated and efficient automated driving work can be performed. Namely, a wrapping work order of the rolls at the roll release points P in circling work is based on a configuration in which the rolls are collected in order based on the baler circling route from the end point of straight-line work, whereby it is not necessary to generate a new route and it is sufficient to set a route shifted only by the offset amount of the wrapping machine 140W, and the wrapping travel path 23 can be easily generated.

A movement distance to the next-process collection point is computed, and in FIG. 7, a movement distance by h-P12-P14-P11-P13 and movement of about one lap using a method such as a reverse movement i to j are covered in a circling route of about two and a half laps. In this case, regarding the roll point on the turning work route, when the lateral movement route can be generated, an automatic driving route is generated according to the rule of generating a route for collecting in advance of the next order (for example, a roll release point P14). Then, the automatic driving route is completed by the movement path i-j and a route j-a with a short movement distance.

As described above, the automatic wrapping travel path 23 (a-b . . . j-a) in which the forward travel route and the reverse travel route are combined is generated by the rules, and the work vehicle 100 attached with the wrapping machine 140W automatically travels along the wrapping travel path 23, and therefore, the rolls at the roll release points P1 to P15 can be efficiently wrapped.

Immediately before the roll approaches during the wrapping work, the work vehicle 100 and the wrapping machine 140W can pick up the roll with high accuracy by correcting the direction based on image data of the imaging device 331 to determine whether or not the direction is orthogonal to the axial direction of the roll in the farm field. The roll released by the baler work is moved in a rotatable direction, and even if a deviation is generated between a roll release point P where the release position is estimated and recorded and an actual roll position, when the roll is collected and wrapped by the wrapping machine 140W, the traveling line of the work vehicle 100 is finely adjusted by the roll position based on the image data of the imaging device 331, and therefore, the roll can be surely collected and wrapped. When the roll release point P on the recorded baler travel route is separated from the actual roll position during the work by a prescribed distance or more, the collection wrapping work of the roll is not performed, and the wrapping travel path 23 for the roll of the next roll release point P is reset.

REFERENCE SIGNS LIST

20 work travel path
22 circling travel path
23 wrapping travel path
102 GNSS receiver
140B roll baler
140W wrapping machine
330 work locus recording control section
331 imaging device
P roll release point
X (roll) axial direction

The invention claimed is:

1. A work vehicle attachable to a roller baler and a wrapping machine, the work vehicle comprising:
   a work locus recording control section configured to record a roll release point by the roll baler when the roller baler is attached to the work vehicle; and
   a path calculation section configured to generate a wrapping travel path, based on the recorded roll release point,
   wherein the work vehicle is configured to move along the wrapping travel path when the wrapping machine is attached to the work vehicle,
   a traveling direction of the wrapping travel path at the roll release point is a direction intersecting an axial direction of a cylindrical roll, and
   a position of the roll release point in a direction intersecting the axial direction of a roll is adjustable based on image data of a position of the roll by an imaging device.

2. The work vehicle according to claim 1, wherein, when it is determined that the work vehicle cannot travel forward at a position of the roll release point, a reverse travel route is generated.

3. The work vehicle according to claim 1, wherein the work vehicle travels along the wrapping travel path in an order starting from the roll release point closest to an end point of the work travel path followed by a plurality of further roll release points.

* * * * *